(12) United States Patent
Mahmoud et al.

(10) Patent No.: US 10,037,458 B1
(45) Date of Patent: Jul. 31, 2018

(54) AUTOMATED SIGN LANGUAGE RECOGNITION

(71) Applicant: King Fahd University of Petroleum and Minerals, Dhahran (SA)

(72) Inventors: Sabri A. Mahmoud, Dhahran (SA); Ala Addin Sidig, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/584,361

(22) Filed: May 2, 2017

(51) Int. Cl.
  *G10L 21/00* (2013.01)
  *G06K 9/00* (2006.01)
  *G06F 3/01* (2006.01)

(52) U.S. Cl.
  CPC ......... *G06K 9/00355* (2013.01); *G06F 3/017* (2013.01); *G06K 9/00389* (2013.01)

(58) Field of Classification Search
  CPC ...................................... G10L 21/00
  USPC ...... 704/500, 3, 281, 231; 600/407; 382/190
  See application file for complete search history.

(56) References Cited

U.S. PATENT DOCUMENTS

| | | | | |
|---|---|---|---|---|
| 5,953,693 A * | 9/1999 | Sakiyama | ............ | G09B 21/009 340/4.13 |
| 6,477,239 B1 * | 11/2002 | Ohki | ................. | G09B 21/009 348/14.01 |
| 7,565,295 B1 * | 7/2009 | Hernandez-Rebollar | ............ | G06K 9/00355 382/182 |
| 9,230,160 B1 * | 1/2016 | Kanter | ............... | G06K 9/00355 |
| 9,524,021 B2 * | 12/2016 | Gharib | .................... | G06F 3/005 |
| 9,791,938 B2 * | 10/2017 | Sugaya | ................. | G06F 3/0304 |
| 2010/0063813 A1 * | 3/2010 | Richter | .................... | G06F 3/014 704/231 |
| 2010/0328481 A1 * | 12/2010 | Shimizu | .................. | G06T 7/507 348/222.1 |
| 2011/0234384 A1 * | 9/2011 | Agrawal | .............. | G09B 21/009 340/10.5 |

(Continued)

OTHER PUBLICATIONS

Sakshi Gupta et al., "Analysis of Hand Gesture Recognition," International Journal of Advanced Research in Computer Science and Software Engineering, vol. 3, No. 5, May 2013, pp. 1332-1339.

(Continued)

*Primary Examiner* — Michael Colucci
(74) *Attorney, Agent, or Firm* — Oblon, McClelland, Maier & Neustadt, L.L.P.

(57) ABSTRACT

A sign language recognizer is configured to detect interest points in an extracted sign language feature, wherein the interest points are localized in space and time in each image acquired from a plurality of frames of a sign language video; apply a filter to determine one or more extrema of a central region of the interest points; associate features with each interest point using a neighboring pixel function; cluster a group of extracted sign language features from the images based on a similarity between the extracted sign language features; represent each image by a histogram of visual words corresponding to the respective image to generate a code book; train a classifier to classify each extracted sign language feature using the code book; detect a posture in each frame of the sign language video using the trained classifier; and construct a sign gesture based on the detected postures.

20 Claims, 13 Drawing Sheets

(56) References Cited

U.S. PATENT DOCUMENTS

| | | | | |
|---|---|---|---|---|
| 2011/0301934 A1* | 12/2011 | Tardif | ................ | G06F 3/017 |
| | | | | 704/1 |
| 2012/0280897 A1* | 11/2012 | Balan | ................ | G06F 3/017 |
| | | | | 345/156 |
| 2013/0114902 A1* | 5/2013 | Sukthankar | ...... | H04N 21/23418 |
| | | | | 382/190 |
| 2013/0217996 A1* | 8/2013 | Finkelstein | .......... | A61B 5/1075 |
| | | | | 600/407 |
| 2014/0201126 A1 | 7/2014 | Zadeh et al. | | |
| 2015/0117708 A1* | 4/2015 | Guigues | ................ | G06T 7/0042 |
| | | | | 382/103 |
| 2015/0363644 A1 | 12/2015 | Wnuk et al. | | |

OTHER PUBLICATIONS

S. Nagarajan et al., "Static Hand Gesture Recognition for Sign Language Alphabets using Edge Oriented Histogram and Multi ClassSVM," International Journal of Computer Applications, vol. 82, No. 4, Nov. 2013, pp. 28-35.

\* cited by examiner

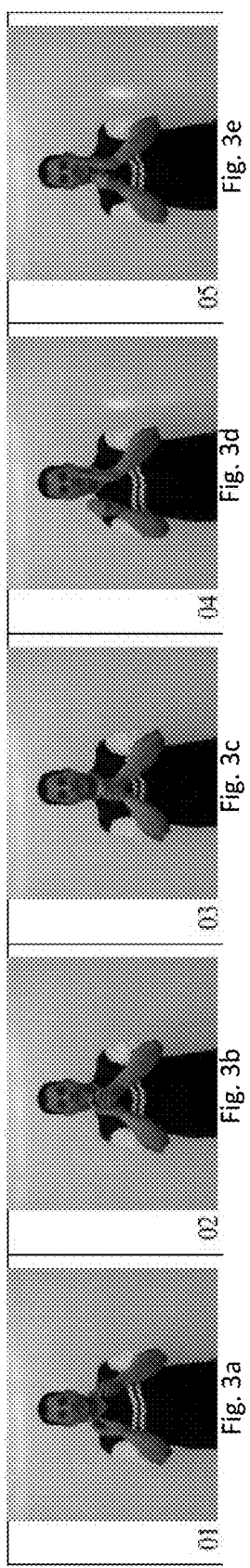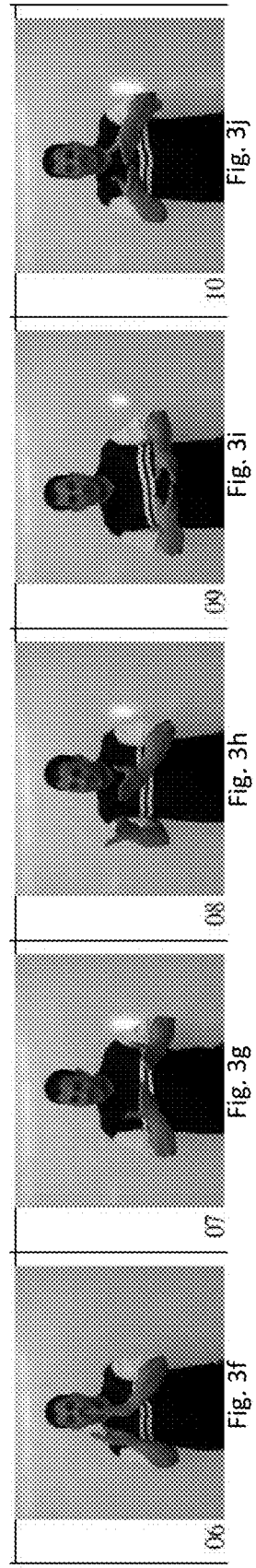

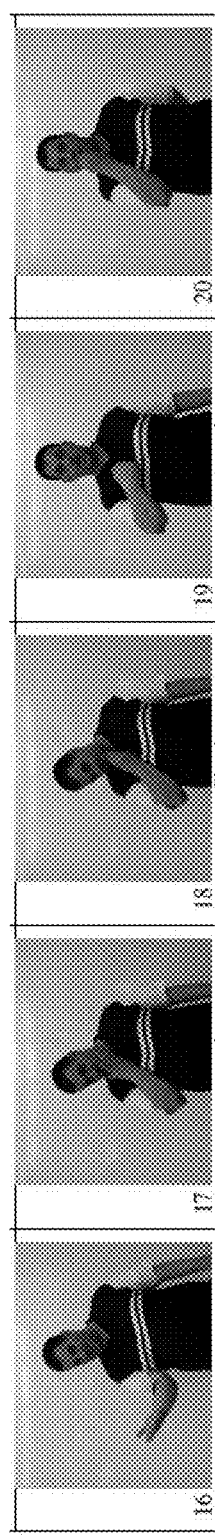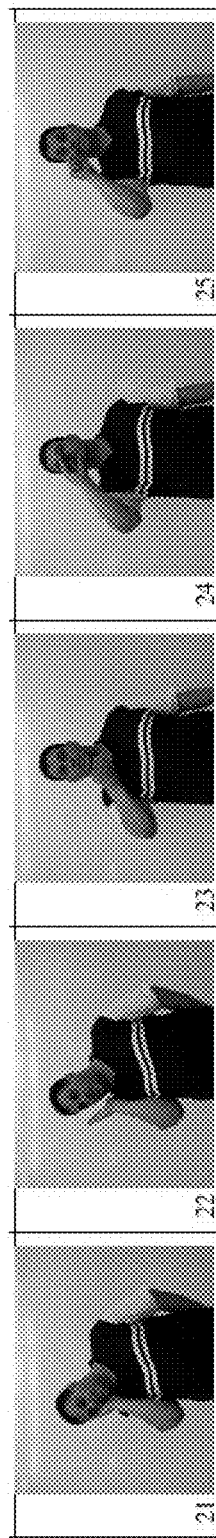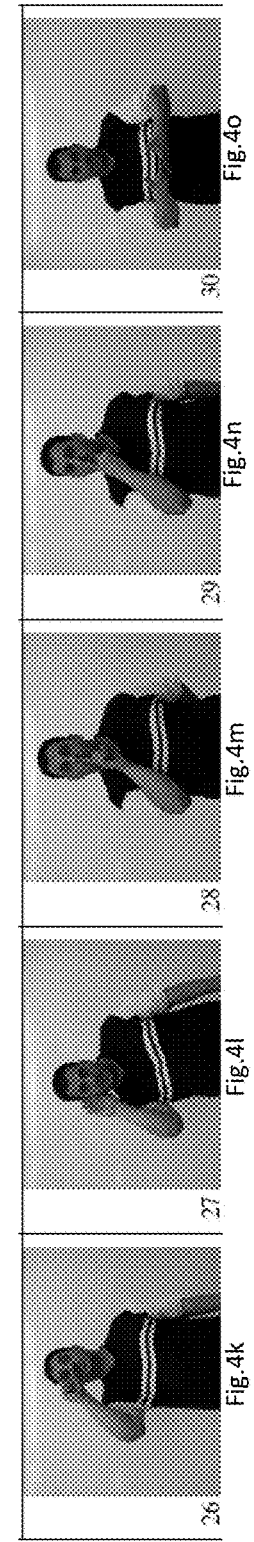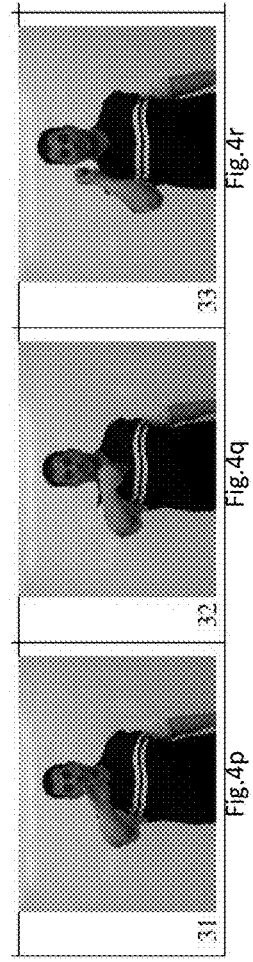

AUTOMATED SIGN LANGUAGE RECOGNITION

BACKGROUND

Field of Disclosure

Embodiments described herein pertain to automated sign language recognition. In particular, Arabic automated sign language recognition is described.

Related Art

Sign language provides a distinct channel of communication among the deaf community and those who interact with them. It is a full featured language with its own grammar and vocabulary. It is a complicated language that utilizes most of the visual medium to convey the signer's thoughts. It includes hand gestures, body lanes, and facial expressions that are all simultaneously performed. Each of these components has a special importance in modifying the meaning of signs. For example, moving the hand opened and facing the ground down may have different meanings. If the signer is looking down, it means a child but, if the signer is looking front, it means relax. To successfully translate a sign, all of these components need to be learned. Of these components the hand gestures are the most important, so most of the systems built to recognize sign languages try to recognize them.

To recognize hand gestures, different techniques are used by researchers. Some researchers model the problem as an object recognition for the hands. Tracking for hand recognition can use skin color thresholding, while others use generative models. Embodiments described herein model the sign as a sequence of body postures. This modeling accounts for both body lane and hands gesturing.

Arabic sign language recognition has been addressed by many researchers using different scales and strategies. The work on Arabic sign language recognition can be classified into three levels, including an Arabic sign alphabet and number recognition level, an isolate words recognition level, and a sentences recognition level. See Tharwat, A., Gaber, T., Hassanien, A. E., Shahin, M., Refaat, B., 2015, Sift-based arabic sign language recognition system, in: Afro-european conference for industrial advancement, Springer. pp. 359-370; El-Bendary, N., Zawbaa, H. M., Daoud, M. S., Hassanien, A. E., Nakamatsu, K., 2010, Arslat: Arabic sign language alphabets translator, pp. 590-595; Assaleh, K., Al-Rousan, M., 2005, Recognition of arabic sign language alphabet using polynomial classifiers, in: EURASIP Journal on Applied Signal Processing 2005, pp. 2136-2145; Tolba, M. F., Abdellwahab, M., Aboul-Ela, M., Samir, A., 2010, Image signature improving by pcnn for arabic sign language recognition, in: Can. J. Artif. Intell. Mach. Learn. Pattern Recognit 1, pp. 1-6; Ahmed, A. A., Aly, S., 2014. Appearance-based arabic sign language recognition using hidden markov models, in: Engineering and Technology (ICET), 2014 International Conference on, IEEE. pp. 1-6; Elons, A. S., Abull-Ela, M., Tolba, M. F., 2013, A proposed pcnn features quality optimization technique for pose-invariant 3d arabic sign language recognition, Applied Soft Computing 13, pp. 1646-1660; Mohandes, M., Deriche, M., Johar, U., Ilyas, S., 2012, A signer-independent arabic sign language recognition system using face detection, geometric features, and a hidden markov model, Computers & Electrical Engineering 38, pp. 422-433; Shanableh, T., Assaleh, K., 2007a, Arabic sign language recognition in user-independent mode, pp. 597-600; Al-Rousan, M., Assaleh, K., Talaa, A., 2009, Video-based signer-independent arabic sign language recognition using hidden markov models, Applied Soft Computing 9, pp. 990-999; Tolba, M. F., Samir, A., Aboul-Ela, M., 2013, Arabic sign language continuous sentences recognition using pcnn and graph matching, Neural Computing and Applications 23, pp. 999-1010; Assaleh, K., Shanableh, T., Fanaswala, M., Bajaj, H., Amin, F., 2008, Vision-based system for continuous arabic sign language recognition in user dependent mode, in: Mechatronics and Its Applications, 2008, ISMA 2008, 5th International Symposium on, IEEE. pp. 1-5; and Assaleh, K., Shanableh, T., Fanaswala, M., Amin, F., Bajaj, H., et al., 2010, Continuous arabic sign language recognition in user dependent mode, Journal of Intelligent learning systems and applications 2, pp. 19, each incorporated herein by reference in their entirety.

Different strategies are addressed by researchers for acquiring signs, extracting discriminative features, and classification. Some researchers used data-gloves to provide measures of finger configurations and hand orientations. See Ritchings, T., Khadragi, A., Saeb, M., 2012, An intelligent computer-based system for sign language tutoring, Assistive Technology 24, pp. 299-308, incorporated herein by reference in its entirety. Other researchers use cameras to record videos of the signer. In some instances, the signer is required to wear colored gloves to ease the segmentation of hands and to handle occlusion, Mohandes et al. (2012). Multi-camera systems are used to capture a 3D image of the signer from different views. See Tolba, M., Samir, A., Abul-Ela, M., 2012, 3d arabic sign language recognition using linear combination of multiple 2d views, in: Informatics and Systems (INFOS), 2012 8th International Conference on, IEEE. pp. MM-6, incorporated herein by reference in its entirety.

After acquisition of signs, discriminative features are extracted. Ritchings et al. (2012) used a 17-bit binary pattern that encoded the sensors' measures as a feature vector. For camera-based systems, most researchers used global features to summarize the entire image in a single-feature vector. Al-Rousan et al. used Discreet Cosine Transform (DCT) to transfer images into frequency domain, and then applied zigzag zonal coding to select a vector of 50 coefficients that are used as features. Shanableh et al. summarized the entire sign video in one image using Accumulative Difference and applied DCT and zigzag zonal coding to form a feature vector of 50 coefficients. See Shanableh, T., Assaleh, K., Al-Rousan, M., 2007, Spatio-temporal feature-extraction techniques for isolated gesture recognition in arabic sign language, IEEE Transactions on Systems, Man, and Cybernetics, Part B (Cybernetics) 37, pp. 641-650, incorporated herein by reference in its entirety.

Pulse-coupled neural network (PCNN) was used by Tolba et al. to extract a time series of a function in the firing status of neurons (image signature). Discreet Fourier Transform (DFT) is applied to this signature and a maximum of 11 DFT descriptors are used as features. See Samir Elons, A., Abull-ela, M., Tolba, M. F., 2013, Pulse-coupled neural network feature generation model for arabic sign language recognition, IET Image Processing 7, pp. 829-836, incorporated herein by reference in its entirety. Mohandes et al. extracted geometric features, wherein skin-color detection is used first to locate the signor's face only in the first frame of the sign's video. The colored gloves are located in the image by a color-based thresholding. The resulting binary image containing the hands is used to extract features. They used the centroids of both hands with respect to the face's centroid, the eccentricity of the bounded ellipse of both hands, the angle of the first principal component of both hands, and the areas of both segmented hands as features. See Mohandes, M., Quadri, S., Deriche, M., 2007, Arabic sign language recognition an image-based approach 1, pp. 272-276; and Mohandes, M., Deriche, M., 2005, Image based arabic sign language recognition 1, pp. 86-89, each incorporated herein by reference in their entirety.

Uniform Local Binary Pattern (LBP) is used to describe the frames of sign words. Skin color is extracted from each frame and the image is cropped to the boundaries of head and arms. For each pixel in the cropped image, the gray level is compared to eight neighbors. If a neighboring pixel is greater than the current center pixel, one is assigned to a cell of an 8-bit code, otherwise 0 is assigned. The 8-bit code is the LBP for this pixel. A 59-bin histogram of these LBPs is used as a feature vector to describe the current frame.

The input frames are binarized such that everything other than the hands is white, while the hands are black. Edge detection is applied to generate a contour image of the hands. A reference point is chosen based on the location of the wrist, either as the bottom left corner or the bottom right corner, or the midpoint between the two corners. From this point, fifty distances to the contour is calculated. These distances form a feature vector.

The above-mentioned researches used global features. The only work known to employ local features is Tharwat et al. (2015). To build a system for alphabet recognition, they used Scale Invariant Features Transform (SIFT) to extract and describe interest points. Linear Discriminant Analysis (LDA) was used to reduce the dimensionality of the features' vector. Their data set consists of still gray-scaled images of hands performing thirty alphabets. The alphabets which involve hand motion are not included.

Hidden Markov Model (HMM) was employed by (Mohandes et al. (2012); Assaleh et al. (2010, 2008); Al-Rousan et al. (2009); and Ahmed and Aly (2014)). They reported an accuracy of 98% on 300 signs, 94% on 40 sentences, 94% on 40 sentences, 97% on 30 signs, and 99% on 23 signs, respectively. A K-Nearest Neighbor (KNN) classifier was used by Tharwat et al. (2015); Shanableh et al. (2007); and El-Bendary et al. (2010). They reported an accuracy of 99% on 30 alphabets with no motion, 87% on 23 signs, and 91% on 30 alphabets with no motion, respectively.

Tolba et al. (2013) modeled signs as a directed graph of sequences of hand postures and used a graph matching algorithm to decide on unseen signs. The reported accuracy was 80% for 30 sentences. For isolated words, they used a two-stage classification. In the first Multi-layer Perseptron (MLP), neural networks was used to detect hand postures. Each sign was represented by a sequence of postures and the best match search was used to classify the signs. The reported accuracy was 95% for the posture classifier and 94% for the sign classifier.

SUMMARY

Different techniques are used for local feature extraction to recognize 23 isolated words. Local features are extracted from each frame of the sign video and converted to a Bag of Features (BoFs) using clustering. In addition, a two-phase classification is used, wherein a BoFs is used in the first phase to recognize postures and a Bag of Postures (BoPs) is used in the second phase to recognize signs.

Body posture is described herein using a BoF. Features are extracted from the training images of different classes which are clustered to generate a code book. Each class is characterized by a histogram of the code book entries. These histograms are used to train a classifier to model the classes. One drawback of BoFs is that it doesn't preserve the context.

A first step in BoFs is feature extraction in which the interest points are detected and described by a discriminative descriptor. Different techniques are commonly employed to detect interest points. Interest points are localized in scale space of an image which is generated by convolving the image with different Gaussian kernels σ. A filter is applied to this scale and the extremal responses are marked as interest points.

Different filters localize different types of interest points. Of these filters, a Difference of Gaussian (DoG) finds blob-like shapes in the image as interest points. DoG is used by Scale Invariant Features Transform (SIFT), which is a popular interest-point localization technique.

A filter that detects corners is a Harris detector. It searches for high gradients in two perpendicular directions to locate corners. After detecting interest points, they are described by a function of the neighboring pixels. A common descriptor in BoFs is a SIFT descriptor. A SIFT descriptor is 128 dimensional histograms of orientations of gradients around the interest point. Another approach for feature extraction omits the interest point detection step and directly finds descriptors at regular grid points. Dense SIFT (DSIFT) is an example of such an approach.

A second step after the feature extraction step is generation of the code book. Clustering is used to group the features in k representatives based on the similarity between them. This code book forms the vocabulary of the visual words found in the dataset. Each image is represented by a histogram of visual words (BoFs) found in that image, regardless of their order of occurrence. These BoFs are used to train and test a classifier based on the labels of the images. Embodiments described herein use BoFs to detect the body posture in each frame of sign video. A bag of these postures (BoPs) is used next to describe the sign.

A scalable system is built to handle a large vocabulary for embodiments used herein. It provided a vision-based signer an independent recognition of sign language. It also emphasized the benefits of using local features over global features.

One embodiment includes a sign language recognizer with circuitry. The circuitry is configured to detect one or more interest points in an extracted sign language feature, wherein the one or more interest points are localized in space and time in each of a plurality of images acquired from a plurality of frames of a sign language video including the extracted sign language feature; apply a filter to determine one or more extrema of a central region of the one or more interest points; associate one or more features with each interest point of the one or more interest points using a neighboring pixel function; cluster a group of extracted sign language features from the plurality of images based on a similarity between the extracted sign language features according to the associating; represent each image of the plurality of images by a histogram of visual words corresponding to the respective image to generate a code book; train a classifier based on labels assigned to the plurality of images to classify each extracted sign language feature using the code book; detect a posture in each frame of the plurality of frames of the sign language video using the trained classifier; and construct a sign gesture based on the detected postures.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3a-3o list classes of postures for poses 1-15 according to one embodiment;

FIGS. 4a-4r list classes of postures for poses 16-33 according to one embodiment;

DETAILED DESCRIPTION

Figure 1A:
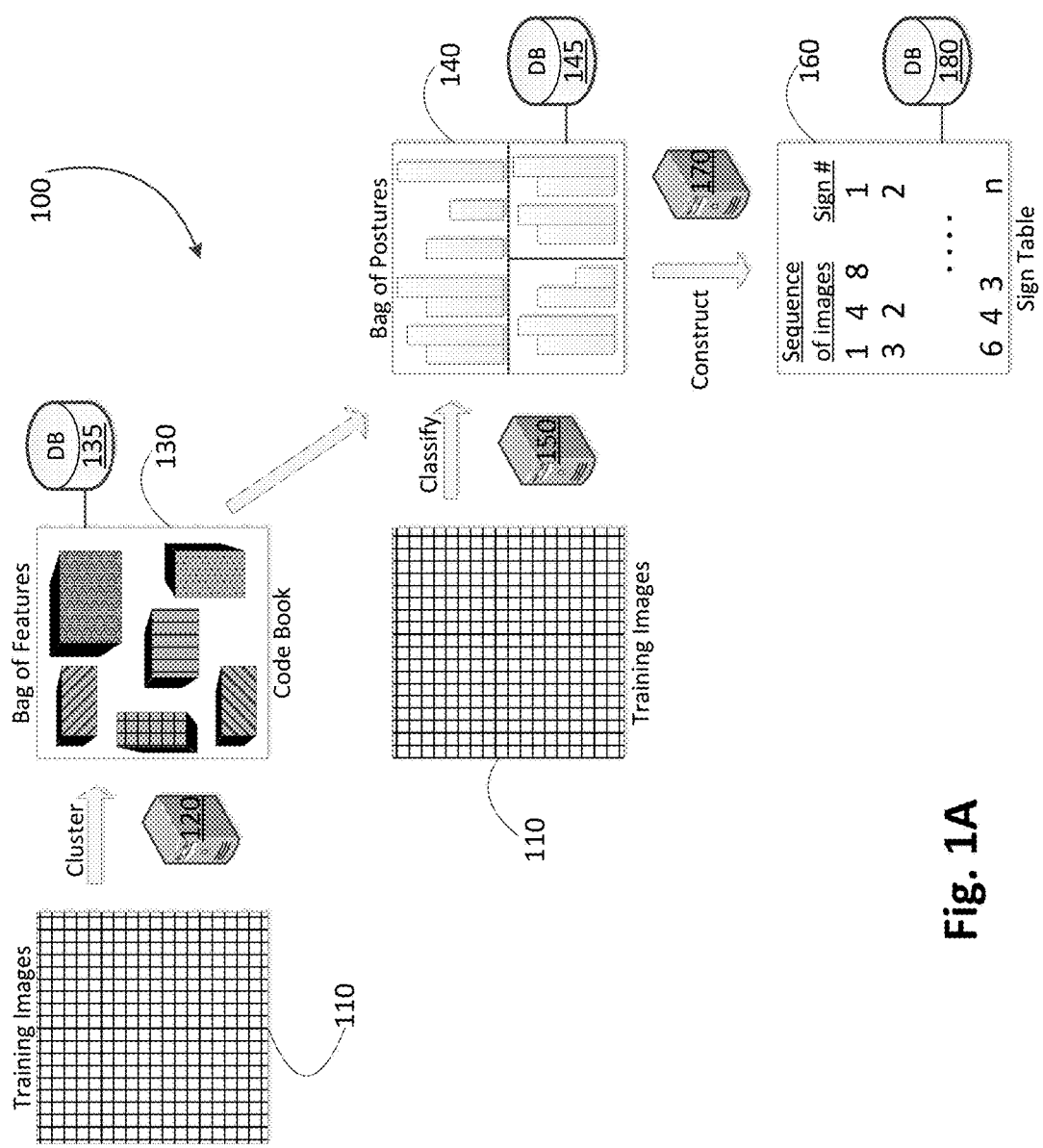
FIG. 1A illustrates an exemplary sign language recognition system according to one embodiment.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

BoFs can be employed for different computer vision problems. It has been employed for image classification, image retrieval, gesture recognition, and human action recognition. See Csurka, G., Dance, C., Fan, L., Willamowski, J., Bray, C., 2004, Visual categorization with bags of keypoints 1, pp. 1-2; Sivic, J., Zisserman, A., 2003, Video google: A text retrieval approach to object matching in videos, in: Computer Vision, 2003, Proceedings, Ninth IEEE International Conference on, IEEE. pp. 1470-1477; Hernan-dez-Vela, A., Bautista, M. A., Perez-Sala, X., Ponce, V., Bar'o, X., Pujol, O., Angulo, C., Escalera, S., 2012. Bovdw: Bag-of-visual-and-depth-words for gesture recognition, in: Pattern Recognition (ICPR), 2012 21st International Conference on, IEEE. pp. 449-452; and Foggia, P., Percannella, G., Saggese, A., Vento, M., 2013, Recognizing human actions by a bag of visual words, in: 2013 IEEE International Conference on Systems, Man, and Cybernetics, IEEE. pp. 2910-2915, each incorporated herein by reference in their entirety.

Csurka et al. (2004) used a Harris detector for interest point detection and SIFT for description, K-means for building the visual word vocabulary, and SVM and Naive Bayes for classification. Sivic et al. used a combination of Harris and Maximally Stable Extremal Regions (MSER) for feature detection and SIFT for description, K-means for building the code book, and Nearest Neighbor for similarity score calculation, Sivic and Zisserman (2003). For gesture recognition, Hernandez-Vela et al. (2012) extracted spatio-temporal interest points using an extension of a Harris detector from RGB and from depth images. Histogram of Oriented Gradients (HOG) was used to describe Red-Green-Blue (RGB) features and concatenation of Viewpoint Feature Histogram (VFH), and Camera Roll Histogram (CRH) was used for depth feature description. K-means was used for building two vocabularies of RGB and depth visual words. K-NN was used for classification of gestures. In an embodiment, a K-NN classifier classifies an object by a majority of its neighbors. The object is assigned to the class most common with its k nearest neighbors.

The database of Shanableh and Assaleh (2007b) includes 23 Arabic sign language gestures (words), performed by three signers. See Shanableh, T., Assaleh, K., 2007b, Telescopic vector composition and polar accumulated motion residuals for feature extraction in arabic sign language recognition, Journal on Image and Video Processing 2007, 9-9, incorporated herein by reference in its entirety. Each gesture is represented by a sequence of still images with no restriction on background or cloth, and no gloves are worn by the signers. Table 1 shows the words used in the data set.

TABLE 1

List of the words in the used data set (Shanableh and Assaleh (2007b))

| # | Arabic word | English Meaning |
|---|---|---|
| 1 | صديق | Friend |
| 2 | جار | Neighbor |
| 3 | ضيف | Guest |
| 4 | هدية | Gift |
| 5 | عدو | Enemy |
| 6 | السلام عليكم | Peace upon you |
| 7 | أهلا وسهلا | Welcome |
| 8 | شكرا | Thank you |
| 9 | تفضل | Come in |
| 10 | عيب | Shame |
| 11 | بيت | House |
| 12 | انا | I/me |
| 13 | بأكل | To Eat |
| 14 | بنام | To sleep |
| 15 | بشرب | To Drink |
| 16 | بستيقظ | To wake up |
| 17 | بسمع | To listen |
| 18 | يسكت | To stop talking |
| 19 | بشم | To smell |
| 20 | بساعد | To help |
| 21 | أمس | Yesterday |
| 22 | يذهب | To go |
| 23 | يأتي | To come |

Seventy percent of the samples were used for training and thirty percent of the samples were used for testing. VLFeat was used for feature extraction and building of the code book. See Vedaldi, A., Fulkerson, B., 2008, VLFeat: An open and portable library of computer vision algorithms, incorporated herein by reference in its entirety. Matlab was used as a programming environment. In addition, a database of 112 ASL signs from National Center for Sign Language and Gesture Resources (NCSLGR) was used to test BoF-based posture recognition. See Neidle, C., Vogler, C., 2012, A new web interface to facilitate access to corpora: Development of the asllrp data access interface (dai), in: Proc. 5$^{th}$ Workshop on the Representation and Processing of Sign Languages: Interactions between Corpus and Lexicon, LREC; and NCSLGR, The national center for sign language and gesture resources (ncslgr) corpus, each incorporated herein by reference in their entirety.

In contrast to conventional methods, feature extraction techniques are described in embodiments herein. Local features (rather than global features) tend to lead to better recognition rates since they are more robust to occlusion and geometrical transformation. In speech recognition techniques, the speech is assumed to be composed of primitive phonemes and therefore, sign language can be composed of primitive poses. Thus, a system that employs robust local features to recognize primitive poses works well for unseen signs.

An exemplary sign language recognition system 100 is illustrated in FIG. 1A. In a first stage, local features are extracted from a plurality of training frames 110 of various postures. Three techniques were tested for local feature extraction, namely SIFT detector and descriptor, Harris Laplace detector with SIFT descriptor, and Dense Scale Invariant Features Transform (DSIFT). The first two techniques detect and describe interest points, while the third describes points in a grid of scale and space. The features, in all cases, are described using a SIFT descriptor.

In a second stage, the local features are clustered, via processing circuitry of a first server 120, into K-visual words to generate a code book 130 using a k-means algorithm. Code book 130 is also referred to as a Bag of Features (BoFs). A BoFs database 135 includes data from multiple generated code books 130.

In a third stage, a Support Vector Machine (SVM) is trained to classify, via processing circuitry of a second server 150, each of the training frames 110 into one of thirty three sign primitive postures, which is referred to as a bag of postures (BoPs) 140. A BoPs database 145 includes data from the thirty three sign primitive postures from classification of a first set of training frames 100, along with classifications of other sets of training frames 100.

In a fourth stage, a signs table 160 is constructed, via processing circuitry of a third server 170, of histograms from primitive poses found in the BoPs 140. The BoPs 140 of the resulting sign is used as a feature vector and stored with other sign tables 160 in a database 180. The servers 120, 150, and 170 can be individual servers as illustrated in FIG. 1A or they can be combined into a single server.

Even though sign language has some similarities between cultures and languages, there is no universal or worldwide sign language. Each country generally has its own native sign language, and some countries have more than one sign language. Therefore, sign language recognition system 100 can incorporate multiple sign languages, which would be based upon the sign language of training frames 110.

Figure 1B:
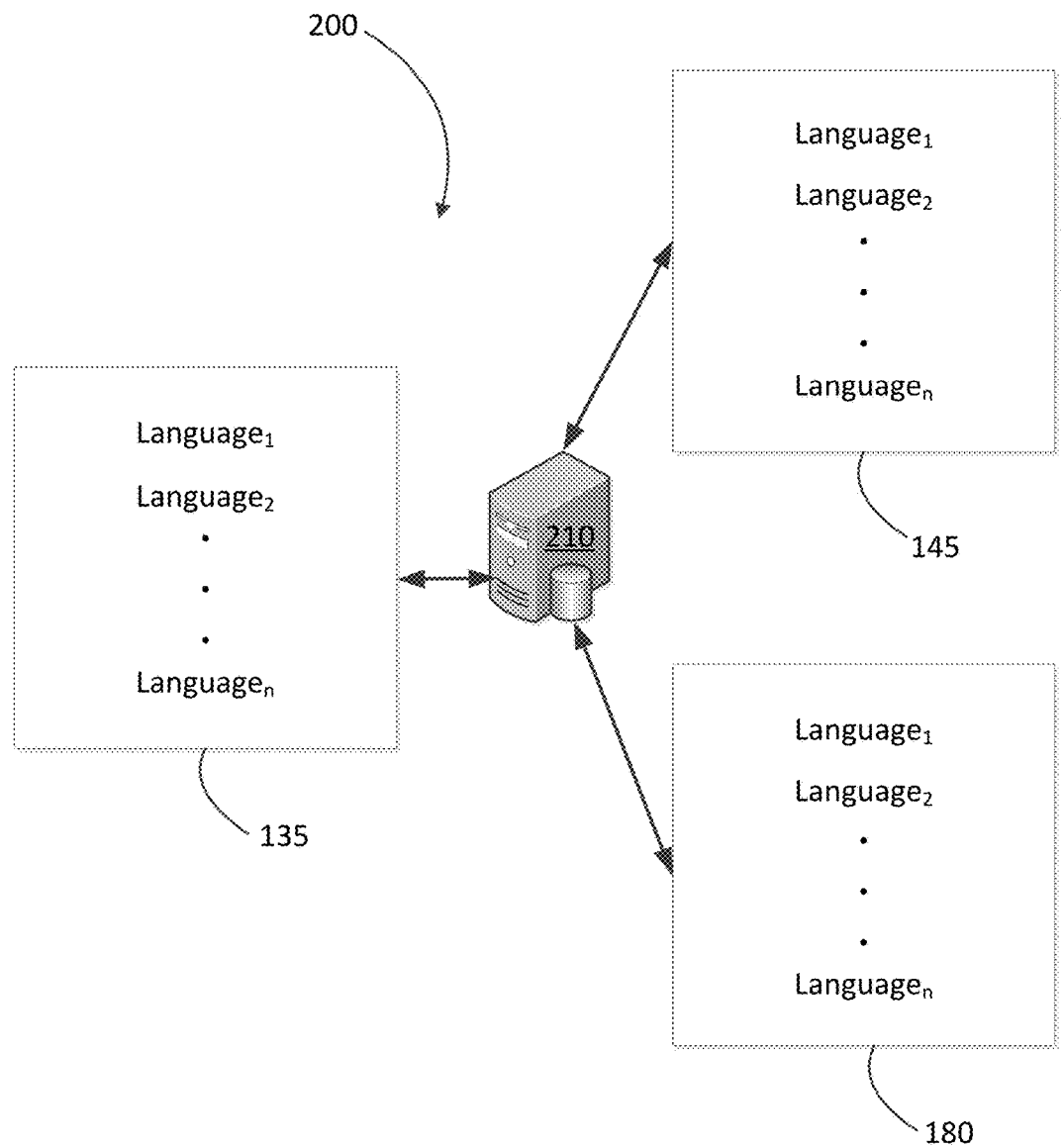
FIG. 1B illustrates a database system according to one embodiment.

FIG. 1B illustrates a database system 200. The BoFs database 135 includes a set of BoF database tables for each language. Likewise, the BoPs database 145 includes a set of BoP database tables for each language. Therefore, when training frames 110 include image frames constructed from the Arabic sign language as an example, the Arabic BoF database table in the BoFs database 135 is cross-referenced to the Arabic BoP database table in the BoPs database 145. This leads to the constructed Arabic sign database table in the sign table database 180, which provides the sequence of images for each associated sign number in the Arabic sign language. Other sign languages are cross-referenced in a similar manner. Each of the BoFs database 135, the BoPs database 145, and sign table database 180 are controlled by a database server 210.

The database system 200 can also include database tables for a first language cross-referenced to database tables for a second different language. Therefore, training frames 110 in a first sign language can be cross-referenced to provide a sequence of images for associated sign numbers in a second sign language.

Figure 1C:
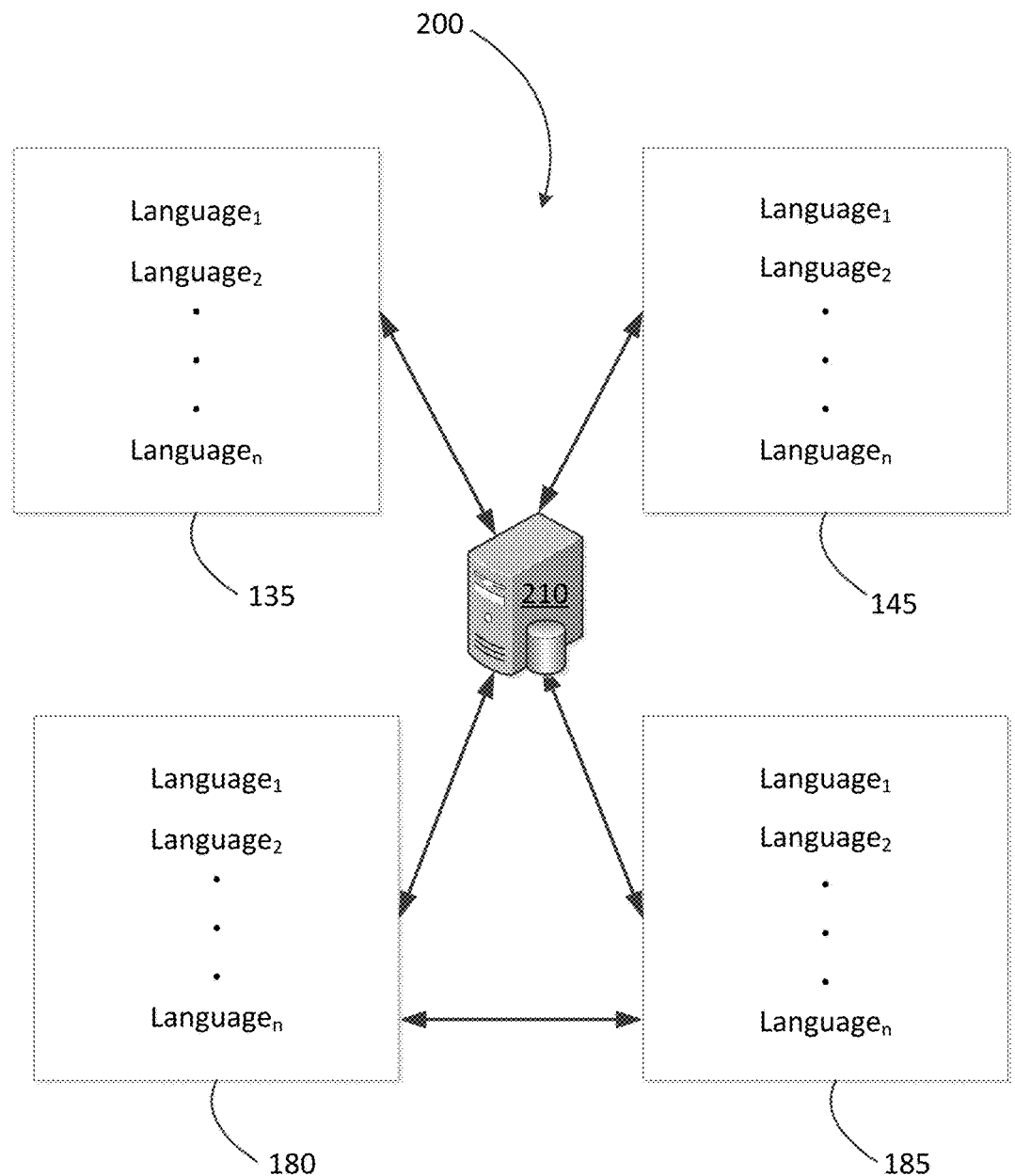
FIG. 1C illustrates a database system with a conversion database according to one embodiment.

FIG. 1C illustrates the database system 200 with a conversion database 185. Each sign language database table in the sign table database 180 has a predetermined order of sign number entries from an associated sequence of images. For example, let us assume the first sign number in an English sign table database 180 is the word "house." Therefore, the first sign number in all sign language database tables is also the associated word for "house." As a second example, the second word in each sign language database table is "dog." Therefore, a conversion from a first sign language to a second sign language cross-references a sign database table entry in the first sign language to a like-numbered sign database table entry in the second sign language. For example, a ninth table entry in the first sign language database table of sign table database 180 is cross-referenced to the ninth table entry in the second sign language database table of conversion database 185.

In an embodiment, the contents of the sign table database 180 are the same as the contents of the conversion database 185. The exemplary database layout of FIG. 1C allows a first language entry to be cross-referenced to a second language entry. However, other systems are contemplated by embodiments described herein. For example, each sign language database table in the sign table database 180 can be internally cross-referenced to all other sign language database tables in the sign table database 180. This would obviate the need for the conversion database 185.

In addition, there may not be a suitable cross reference from each table entry of one sign language to a like-numbered table entry in all other sign languages. Therefore, some sign language database tables may have more entries than other sign language database tables.

The work of Shanableh et al. (2007) was reproduced for a comparative study in contrast to embodiments described herein. Temporal and spacial features were extracted according to the work done by Shanableh et al. (2007). For temporal features, the motion is accumulated into one image that describes the activity during the whole sign. This is accomplished by using a forward accumulated difference of successive frames, as follows. Let $P_{g,i}$ denote an image index j of the ith repetition of sign g, wherein the forward prediction ($P_{g,i}$) is given by:

$$P_{g,i} = \sum_{j=1}^{n-1} \delta(I_{g,i}^{j} - I_{g,i}^{j+1}) \qquad (1)$$

where n is the total number of images and 5 is a binary threshold empirically determined as the mean of non-zero difference pixels. The resulting image is filtered by a median filter, which removes the isolated prediction errors, since they can be assumed to be noise. However, this can also be due to facial expressions, which was not considered.

For spacial feature extraction, a 2D DCT transformation was applied on the accumulated temporal differences image. The Zigzag zonal coding was used and fifty descriptors were used as a feature. The fifty DCT cutoff was determined empirically by examining different cutoff points. In the implementation, the K-NN was used for deciding on the sign and testing the effect of DCT cutoff.

The accumulated difference image of Shanableh for each sign was produced using equation (1), and the image is filtered and transformed using DCT as described herein. The fifty DCT feature vector for 70% of the signs was used as training features and the remaining 30% was used as testing features. The most confused signs in the confusion matrix are sign 12, in which the user points to his chest by rotating his hand towards his body. In sign 21, the signer's hand starts pointing to his chest and then rotates outward in the opposite direction, similar to the motion in sign 12.

As the system accumulates the differences, these two different motions are equivalent and thus, confusing. This can be true for any signs with the same motion trajectory, but in opposite directions. The recognition accuracy is 98.8% for the first signer, 96.8% for the second signer, and 99% for the third signer.

Figure 2:
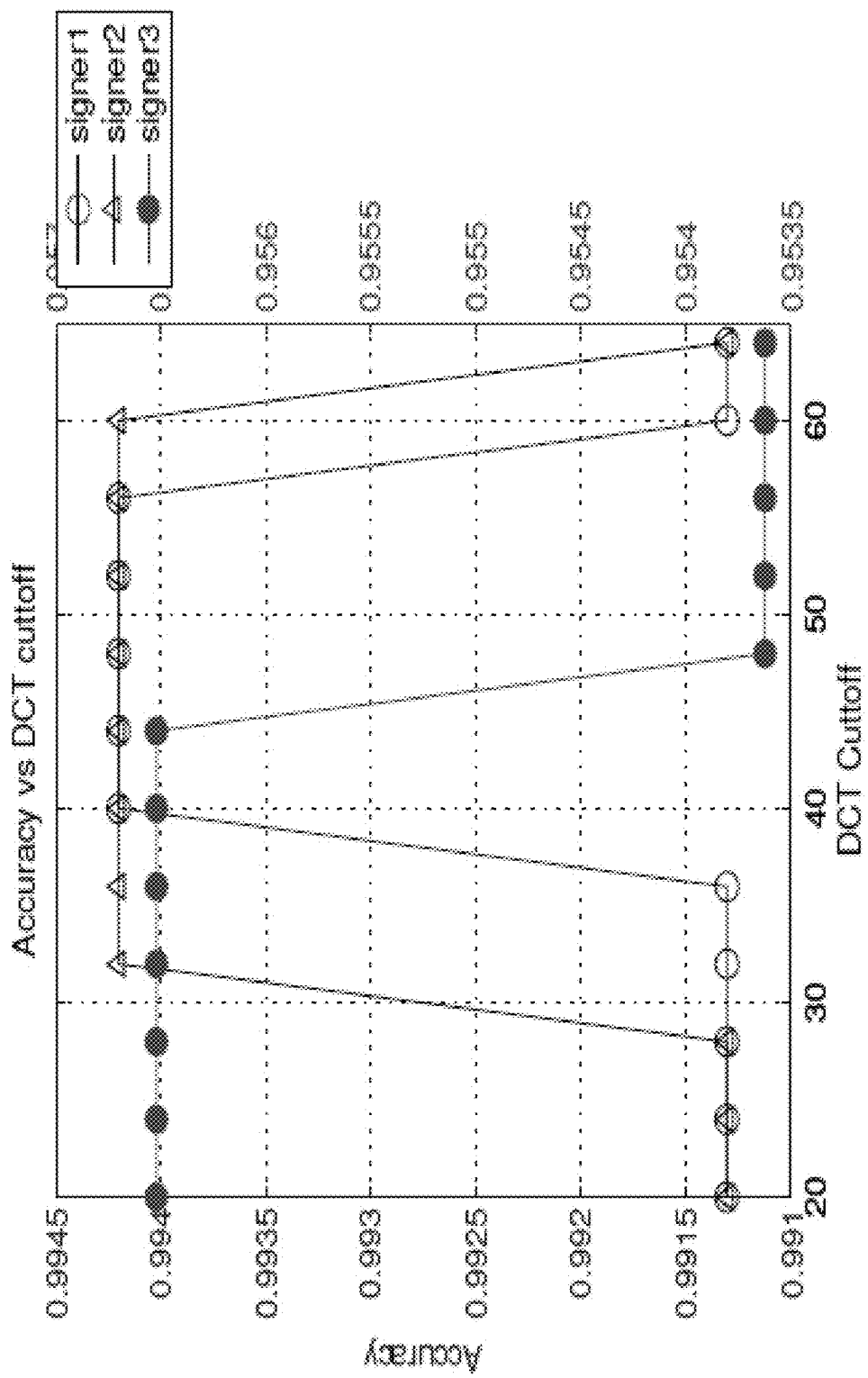
FIG. 2 illustrates an effect of DCT cutoff on recognition accuracy according to one embodiment.

FIG. 2 illustrates the effect of the DCT cutoff on the recognition accuracy. This was found to be signer-dependent, and the cutoff at fifty was found to be at the peak for most signers. However, a value of 40 to 45 was determined to be suitable for all.

Testing the DCT approach for signer-independence showed very poor accuracy at 17.67%, as the DCT is a global feature. This poor accuracy was obtained due to conducting the training using the first signer and conducting the testing using the third signer. It was determined that this method is not suitable for signer-independent recognition. Therefore, in line with the goal of signer-independent recognition, some modifications were used, and the signers were asked to wear colored gloves.

In contrast to Shanableh, embodiments herein describe a classification stage in which the extracted features are fed to a classifier. In an embodiment, a two-stage classifier is used. In a first stage, the BoFs of the frames of the test sign were extracted. A SVM is used to classify the posture in each frame.

The classes of postures are listed in FIGS. 3a-3o (poses 1-15) and FIGS. 4a-4r (poses 16-33). In a second stage, the BoPs which were used to classify the signs are extracted using a K-NN classifier. Experiments were conducted to tune the choice of a suitable number of clusters in generating the BoFs and the BoPs using the validation data.

The approach for embodiments described herein involves building the code book 130 using a bag of visual words, i.e. the BoFs and the BoPs to recognize the sign. Local features are collected first. In this stage, three techniques of DSIFT, SIFT, and Harris Laplace detector with SIFT descriptor were tested.

Figure 5B:
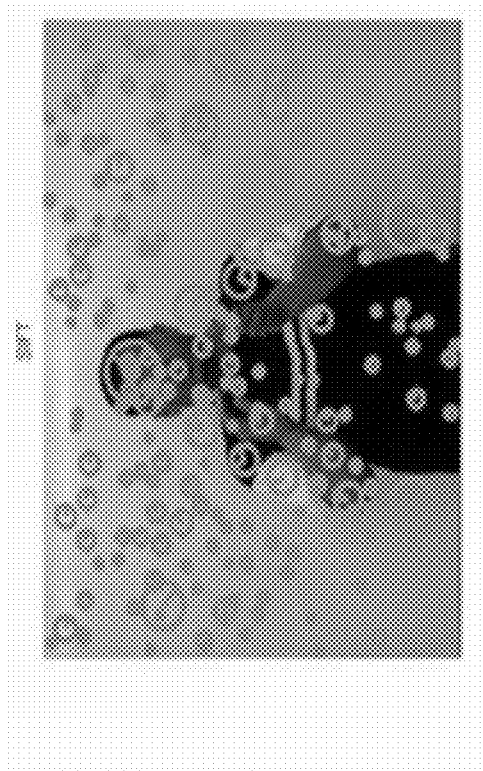
FIG. 5B illustrates interest points from the SIFT detector according to one embodiment.
Figure 5C:
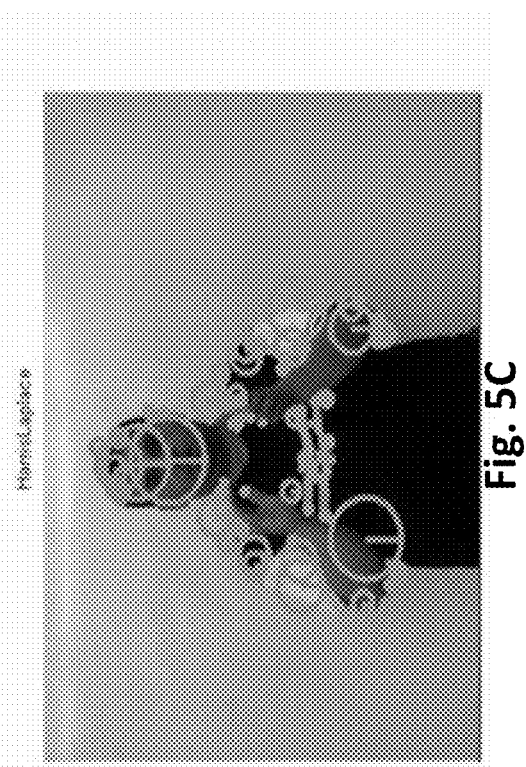
FIG. 5C illustrates interest points from the Harris detector according to one embodiment.
Figure 5A:
FIG. 5A illustrates interest points from the DSIFT detector according to one embodiment.

FIGS. 5A-5C illustrate the difference between interest points, wherein FIG. 5A illustrates interest points from the DSIFT detector, FIG. 5B illustrates interest points from the SIFT detector, and FIG. 5C illustrates interest points from the Harris detector. Interest points detected by the SIFT detector are shown to be distributed on different locations of the image, and many of them are on the background. The Harris detector tends to fit well on the signer's body, but there are fewer points to catch the details of the body parts. However, DSIFT was able to provide good details, since it samples the image on a uniform grid. The above differences directly influence the classification accuracy. Accuracies of 99.39%, 97.7%, and 91.5%, were obtained using DSIFT, Harris, and SIFT, respectively.

Figure 6:
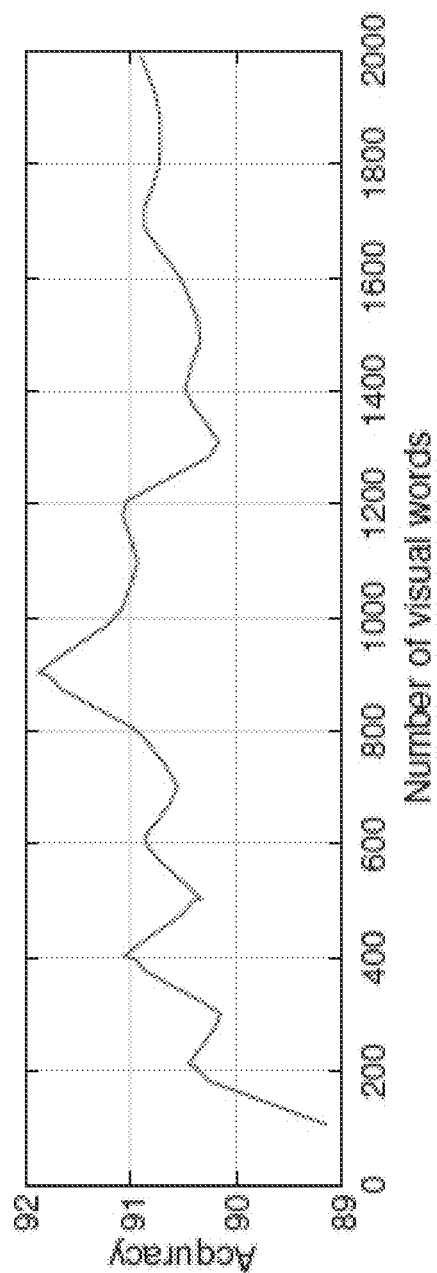
FIG. 6 is a graph illustrating the accuracy of different numbers of clusters according to one embodiment.

Clustering is applied to build a vocabulary of visual words. A number of clusters were experimented with to obtain the code book of visual words using validation data. 100, 200, . . . , 2000 visual words were tested. FIG. 6 is a graph illustrating the accuracy of different numbers of clusters. 900 visual words were selected, which gave the best accuracy, as illustrated in the graph of FIG. 6. A K-means algorithm was used for clustering with Elkan's algorithm to speed up the clustering process. See Elkan, C., 2003. Using the triangle inequality to accelerate k-means, in: ICML, pp. 147-153, incorporated herein by reference in its entirety.

Figure 7A:
FIGS. 7A-7B illustrate some confusing postures according to one embodiment.
Figure 7B:

The resulting code book was used to describe each posture as a BoF. An SVM was trained to decide on thirty three primitive postures, which were identified in the data set using clustering. The thirty three postures were the distinctive postures from which twenty three signs in the data set were generated. The accuracy of the resulting classifier was 94%. FIGS. 7A-7B illustrate the most confusing postures for posture 4 and posture 6, which were highly similar with a difference of only one hand shape.

The table of signs was built using the BoPs. Three types of features were experimented with to describe the sign, namely the BoPs, a concatenation of the BoPs for each half of the sign sequence, and the normalized concatenation of the BoPs for each half of the sign sequence. The first features build the BoPs of the sign, which ignores the order of postures. To preserve the order of postures, the sign sequence was split into two parts, wherein a BoPs was built for each part.

The BoPs were concatenated to form the second type of features. Two parts were determined to be adequate since most of the signs in the data set are composed of four frames or less. The number of frames in each sample for the same signs was not fixed, since it depends on how fast the sign was performed. To form a consistent feature vector, the BoP was normalized by the number of frames in the sign sample. An accuracy of 90.47% was obtained when using non-split and non-normalized BoPs. The most confusing signs were sign 23 and sign 21. The two signs are composed of the same postures, but in a reverse order. This can be confusing since the BoP of both sequences are the same. Splitting the sign into two parts and extracting the BoPs of each part, and concatenating the result resolved the problem.

Several experiments were conducted to test for signer-independence. In a first scenario, a sign table was built using signs performed by a first signer and was tested by signs performed by a second signer. In a second scenario, the sign table was built using signs performed by the first or second signer and was tested using a third signer, which was not used for training of the posture classifier. For the first scenario, a high accuracy of 91.3% was obtained when testing used the second signer (the first signer was used in training) and when testing used the first signer (the second signer was used in training). A K-NN was used to classify signs. Different distance measures were used for Cosine, Correlation, and Euclidean. The best results were obtained using the Euclidean distance measure.

Systems and methods described herein outperform the accumulated difference method of Shanableh when tested in a user-independent mode. An accuracy of 45.17% was obtained when testing the second scenario using embodiments described herein, compared to 17.67% by the accumulated difference method of Shanableh.

The valuable information for signs is in the head and arms. Therefore, in additional experiments, skin-color thresholding was used to keep only the face and arms prior to extracting features. The RGB image was transformed to YCbCr color space and simple thresholding was applied on the values of Cb and Cr images for each pixel. This affected both of the classification stages. The posture classifier accuracy slightly improved to reach 94.98%. This improved the results for a signer-independent case, wherein the accuracy jumped to 66.96%.

Table 2 summarizes results for the accumulated difference method of Shanableh in the first row and the results for embodiments described herein in the second row. The % C and % E columns list the percentage of the correct rates and the percentage of error rates, respectively.

TABLE 2

Summary of Results

| | Signer dependent | | Signer independent | | | | | |
|---|---|---|---|---|---|---|---|---|
| | | | Scenario 1 | | Scenario 2 | | Scenario 2 Skin | |
| | %C | %E | %C | %E | %C | %E | %C | %E |
| Ace Diff | 98.84 | 1.16 | | | 17.67 | 82.33 | | |
| BoF&BoP | 99.39 | 0.61 | 91.3 | 8.7 | 45.17 | 54.83 | 66.96 | 33.04 |

Figure 8:
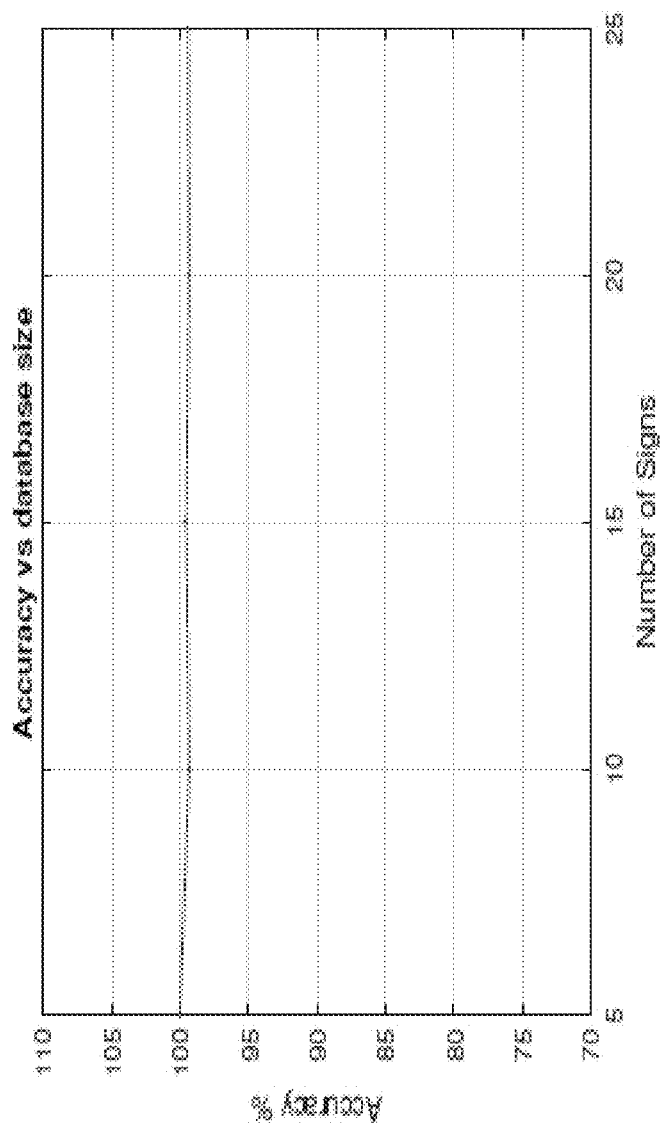
FIG. 8 is a graph which illustrates testing the scalability of a system according to one embodiment.

FIG. 8 is a graph which illustrates testing the scalability of the system by varying the number of signs included from the database. As illustrated in FIG. 8, a stable and steady accuracy was reported for different vocabulary sizes of embodiments described herein. The method of embodiments described herein was tested on a larger database, using a downloaded database of 112 ASL signs from the National Center for Sign Language and Gesture Resources site (NC-SLGR). The 112 signs were chosen such that each sign had at least ten samples. The database included the most frequently used hand postures in ASL. Table 3 lists the words used in the database. Eighty six postures found in this database were extracted and the BoFs technique was applied to it. The accuracy of the postures classifier on the database was 93.0%.

TABLE 3

List of the 112 words in ASL database

| 1. AGAIN | 2. AND | 3. ARRIVE | 4. BAD |
|---|---|---|---|
| 5. BEFORE | 6. BETTER | 7. BIG | 8 BOOK |
| 9. BUT | 10. BUY | 11. CAN | 12. CANNOT |
| 13. CAR | 14. CHOCOLATE | 15. COP | 16. DEAF |
| 17. DECIDE | 18. DIFFERENT | 19. DO | 20. DRIVE |
| 21. EAT | 22. END | 23. ENTER | 24. FAVORITE/PREFER |
| 25. FEEL | 26. FINALLY | 27. FIND/FIND-OUT | 28. FINE |
| 29. FINISH | 30. FOOTBALL | 31. FOR | 32. FORMERLY |
| 33. FRIEND | 34. FROM | 35. FUTURE | 36. GET |
| 37. GO | 38. GOOD/THANK-YOU | 39. GO-OUT | 40. GROUP/TOGETHER |
| 41. HAVE | 42. HEARING | 41 HERE | 44. HIT |
| 45. HOPE | 46. HOW-MANY/MANY | 17. IF | 48. IN |
| 49. INFORM | 50. KNOW | 51. KNOW+NEG | 52. LATER |
| 53 LEARN-AGENT | 54. LIKE | 55. LITTLE-BIT | 56. LIVE |
| 57 WOK | 58. LOVE | 59. MAKE | 60. MAN |
| 61. MAYBE | 62. MEAT | 63. MORE | 64. MORNING |
| 65. MOTHER | 66. MOTORCYCLE | 67. MOUSE/FICTION | 68. MOVIE |
| 69. MUST | 70. NEVER | 71. NONE/NOTHING | 72. NOT |
| 73. NOW | 74. ON | 75. ONE | 76. OTHER |
| 77. OVER/AFTER | 78. PAST | 79. PLAY | 80. RAIN |
| 81. READ | 82. REALLY | 83. REALLY-MORK | 84. RECENT-PAST |
| 85. SAME | 86. SAY | 87. SEE | 88. SLEEP |
| 89. SOME | 90 SOMETHING/ONE | 91. START | 92. STILL |
| 93. TAKE-OFF | 94. TELL | 95. THAT | 96. THING |
| 97. THINK | 98. THROUGH | 99. TIME | 100. TO/UNTIL |
| 101. TWO | 102. UP-TO-NOW | 103. WAIT | 104 . WANT |
| 105. WATER | 106. WHAT | 107. WHEN | 108. WHO |
| 109. WHY | 110. WITH | 111. WORK | 112. YESTERDAY |

A two-stage classification system is described herein, which classifies each frame into one of the primitive postures in a first stage, which accounts for both hand-shapes and body-lane using the BoFs. In the second stage, the sequence of postures is classified into signs using BoPs. For posture classification, the BoFs is used with three different local feature extraction techniques, namely SIFT, Harris, and DSIFT. K-means is used for building the vocabulary, and SVM is used for the classification of the primitive postures using BoFs. The second stage encodes the signs as the BoPs composed of primitive postures, which uses a K-NN classifier to classify the signs. Application of computer-vision techniques have been developed therefrom.

Each of the functions of the described embodiments can be implemented by one or more processing circuits. A processing circuit includes a programmed processor, which includes circuitry. A processing circuit/circuitry can also include devices such as an application specific integrated circuit (ASIC) and circuit components arranged to perform the recited functions. The processing circuitry can be referred to interchangeably as circuitry throughout the disclosure.

In addition, when processors are programmed to perform the processes described herein, they become special-purpose devices. The processes performed by the servers 120, 150, and 170, and the database 180 have specialized processing circuitry. The servers 120, 150, and 170 can be individual servers as illustrated in FIG. 1A or they can be combined into a single server.

Figure 9:
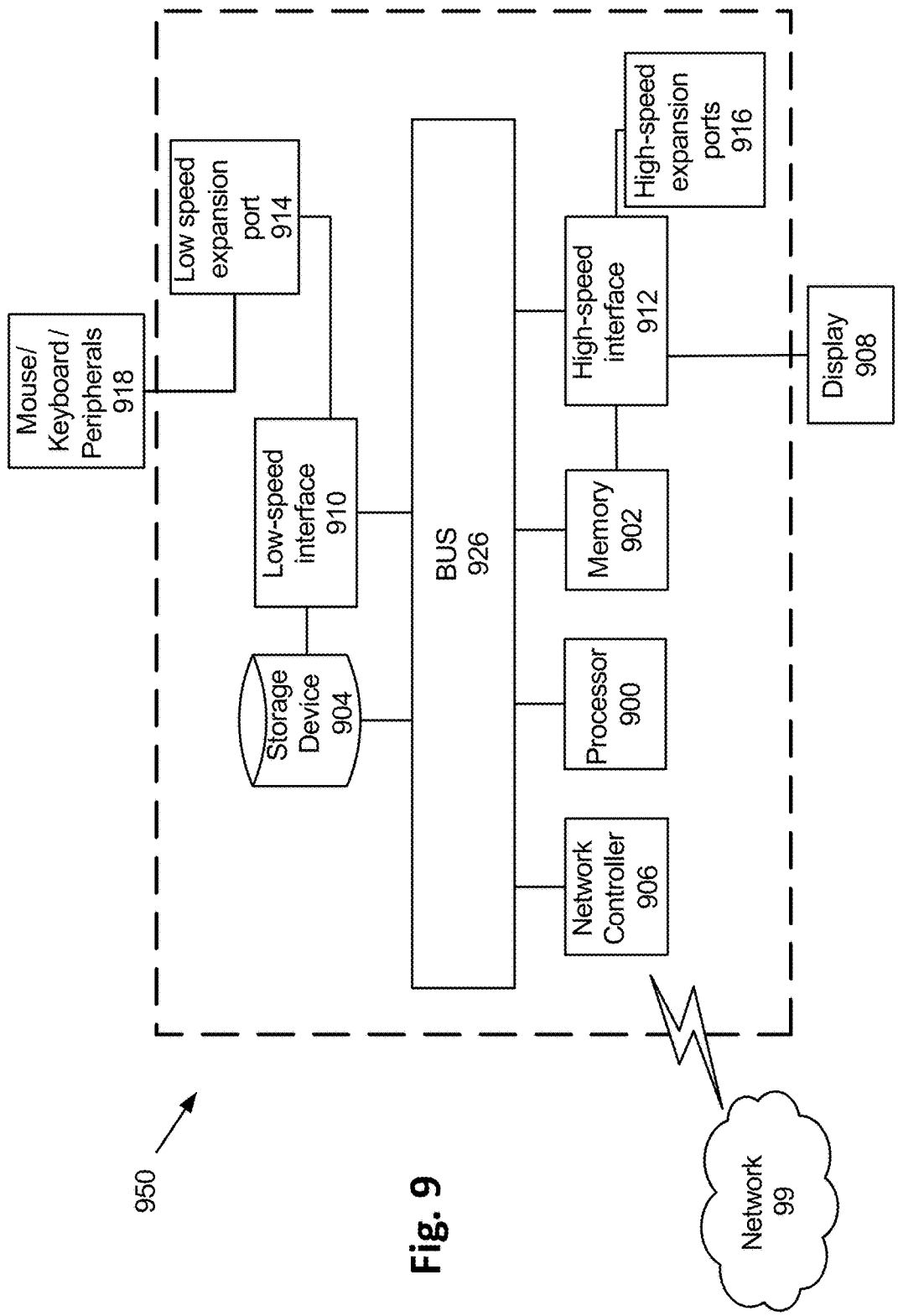
FIG. 9 is a schematic of an exemplary computing device according to one embodiment.

FIG. 9 is a schematic of an exemplary computing device 950, such as the servers 120, 150, 170, and 210, and the databases 135, 145, 180, and 185, all of which can be used to implement the techniques described in this disclosure. The computing device 950 is intended to represent various forms of digital hardware, such as laptops, desktops, workstations, personal digital assistants, servers, blade servers, mainframes, and other appropriate computers. The components shown here, their connections and relationships, and their functions are meant to be examples only and are not meant to be limiting.

The computing device 950 includes a processor 900, a memory 902, a storage device 904, a high-speed interface 912 connecting to the memory 902 and multiple high-speed expansion ports 916, and a low-speed interface 910 connecting to a low-speed expansion port 914 and the storage device 904. Each of the processor 900, the memory 902, the storage device 904, the high-speed interface 912, the high-speed expansion ports 916, and the low-speed interface 910 are interconnected using various busses, such as communication bus 926, and may be mounted on a common motherboard or in other manners as appropriate.

The processor 900 can process instructions for execution within the computing device 950, including instructions stored in the memory 902 or on the storage device 904 to display graphical information for a GUI on an external input/output device, such as a display 908 coupled to the high-speed interface 912. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). The memory 902 stores information within the computing device 950. In some implementations, the memory 902 is a volatile memory unit or units. In some implementations, the memory 902 is a non-volatile memory unit or units. The memory 902 can also be another form of computer-readable medium, such as a magnetic or optical disk.

The storage device 904 is capable of providing mass storage for the computing device 950. In some implementations, the storage device 904 can be or contain a computer-readable medium, such as a floppy disk device, a hard disk device, an optical disk device, a tape device, a flash memory or other similar solid state memory device, or an array of devices, including devices in a storage area network or other configurations. Instructions can be stored in an information carrier. The instructions, when executed by one or more processing devices (for example, processor 900), perform one or more methods, such as those described above. The instructions can also be stored by one or more storage devices, such as computer- or machine-readable mediums (for example, the memory 902, the storage device 904, or memory on the processor 900).

The high-speed interface 912 manages bandwidth-intensive operations for the computing device 950, while the low-speed interface 910 manages lower bandwidth-intensive operations. Such allocation of functions is an example only. In some implementations, the high-speed interface 912 is coupled to the memory 902, the display 908 (e.g., through a graphics processor or accelerator), and to the high-speed expansion ports 916, which may accept various expansion cards (not shown). In the implementation, the low-speed interface 910 is coupled to the storage device 904 and the low-speed expansion port 914. The low-speed expansion port 914, which can include various communication ports (e.g., USB, Bluetooth, Ethernet, wireless Ethernet) can be coupled to one or more input/output devices 918, such as a keyboard, a pointing device, a scanner, or a networking device such as a switch or router, e.g., through a network adapter.

The computing device 950 also includes a network controller 906, such as an Intel Ethernet PRO network interface card from Intel Corporation of America, for interfacing with a network 99. As can be appreciated, the network 99 can be a public network, such as the Internet, or a private network such as an LAN or WAN network, or any combination thereof and can also include PSTN or ISDN sub-networks. The network 99 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

Although the computing device of FIG. 9 is described as having a storage medium device 904, the claimed advancements are not limited by the form of the computer-readable media on which the instructions of the described processes are stored. For example, the instructions can be stored on CDs, DVDs, in FLASH memory, RAM, ROM, PROM, EPROM, EEPROM, hard disk, or any other information processing device with which the computing device communicates.

In other alternate embodiments, processing features according to the present disclosure may be implemented and commercialized as hardware, a software solution, or a combination thereof. Moreover, instructions corresponding to processes described herein could be stored in a portable drive, such as a USB Flash drive that hosts a secure process.

Computer programs (also known as programs, software, software applications, or code) associated with the processes described herein include machine instructions for a programmable processor, and can be implemented in a high-level procedural and/or object-oriented programming language, and/or in assembly/machine language. As used herein, the terms machine-readable medium and computer-readable medium refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described herein can be implemented on a computer having a display device 908 (e.g., a CRT (cathode ray tube) or LCD (liquid crystal display) monitor) for displaying information to the user and a keyboard and a pointing device 918 (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

Embodiments described herein can be implemented in conjunction with one or more of the devices described above with reference to FIG. 9. Embodiments are a combination of hardware and software, and processing circuitry by which the software is implemented.

Figure 10:
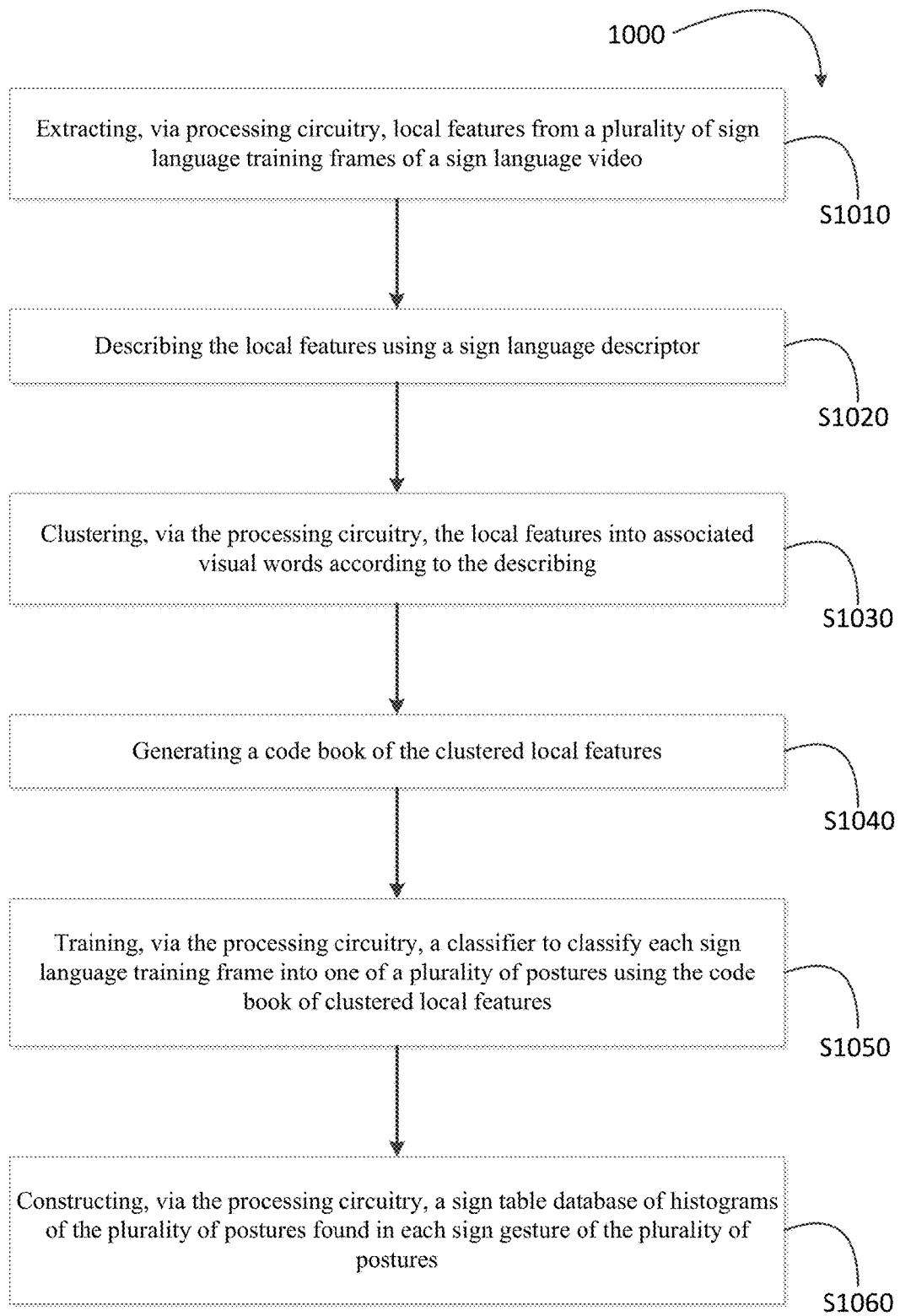
FIG. 10 is a flowchart for an exemplary first method of recognizing sign language according to one embodiment.
Figure 11:
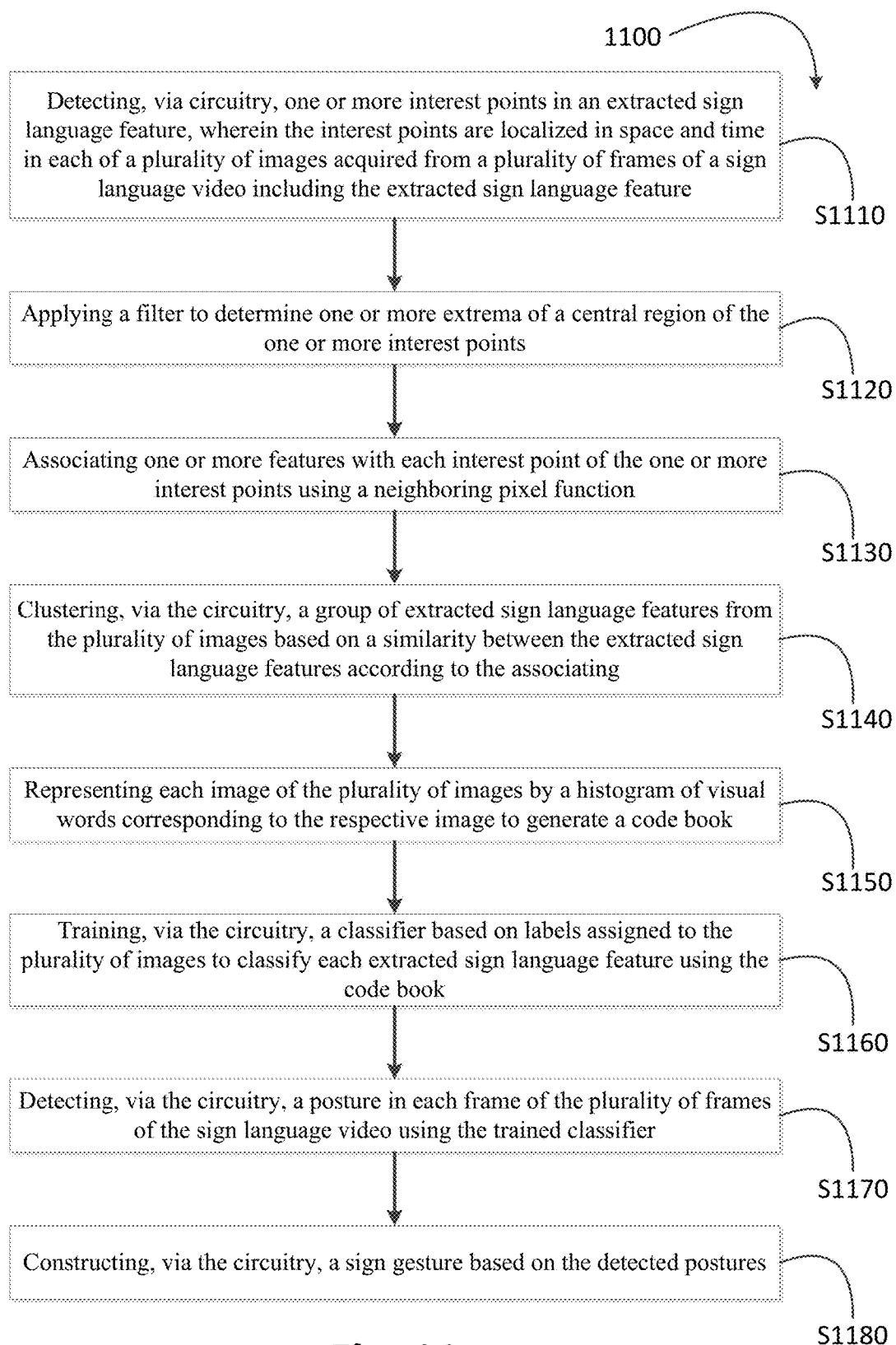
FIG. 11 is a flowchart for an exemplary second method of recognizing sign language according to one embodiment.

FIG. 10 and FIG. 11 illustrate flowcharts for an exemplary method 1000 and method 1100 of recognizing sign language according to an aspect of the present disclosure. Methods 1000 and 1100 include programmable computer-executable instructions, that when used in combination with the above-described hardware devices, carry out the steps of methods 1000 and 1100. The hardware description above, exemplified by the structural example illustrated in FIG. 9 constitutes or includes specialized corresponding structure that is programmed or configured to perform the algorithms illustrated in FIG. 10 and FIG. 11.

Method 1000 includes a first method of recognizing sign language. In step S1010, local features are extracted, via processing circuitry, from a plurality of sign language training frames of a sign language video. Method 1000 can also include detecting one or more interest points in the extracted local features, and applying a filter to determine outermost or farthest regions of the one or more interest points. In one embodiment, a filter is applied to determine one or more extrema of a central region of the one or more interest points.

In step S1020, the local features are described using a sign language descriptor. In one embodiment, a Scale Invariant Features Transform (SIFT) descriptor can be used to detect the one or more interest points.

In step S1030, the local features are clustered, via the processing circuitry, into associated visual words according to the description of the local features. The local features can be clustered into a Bag of Features. In step S1040, a code book is generated of the clustered local features.

In step S1050, a classifier is trained, via the processing circuitry, to classify each sign language training frame into one of a plurality of postures using the code book of clustered local features. In one embodiment, a Support Vector Machine is trained to classify each sign language training frame.

In step S1060, a sign table database is constructed, via the processing circuitry, of histograms of the plurality of postures found in each sign gesture of the plurality of postures. Method 1000 can also include splitting a sequence of postures and generating a split histogram of postures for each split posture, and concatenating the split postures to preserve an order of postures in the sign gestures. The split histogram of the postures of the sign language video can be normalized to account for a difference in signing speed.

Method 1100 includes a second method of recognizing sign language. In step S1110, one or more interest points are detected, via circuitry, in an extracted sign language feature. The one or more interest points are localized in space and time in each of a plurality of images acquired from a plurality of frames of a sign language video including the extracted sign language feature. In one embodiment, a SIFT descriptor is used to detect the one or more interest points.

In step S1120, a filter is applied to determine one or more extrema of a central region of the one or more interest points. In one embodiment, a Difference of Gaussian (DoG) filter is used to detect a blob-like shape in the interest points.

In step S1130, one or more features are associated with each interest point of the one or more interest points using a neighboring pixel function. In one embodiment a filter is applied to determine extremal responses of the interest points.

In step S1140, a group of extracted sign language features is clustered, via the circuitry, from the plurality of images based on a similarity between the extracted sign language features according to the associating. The group of extracted sign language features can be clustered into a Bag of Features.

In step S1150, each image of the plurality of images is represented by a histogram of visual words corresponding to the respective image to generate a code book. In one embodiment, a sign table database is constructed of the histogram of visual words.

In step S1160, a classifier is trained, via the circuitry, based on labels assigned to the plurality of images to classify each extracted sign language feature using the code book. In one embodiment, the labels are classified via a K-Nearest Neighbors (K-NN) classifier.

In step S1170, a posture is detected, via the circuitry, in each frame of the plurality of frames of the sign language video using the trained classifier. In step S1180, a sign gesture is constructed, via the circuitry, from the detected postures.

Embodiments described herein show the strength of the local features compared to the global features used in the reproduced work. Results showed a better accuracy for signer-dependent results than the reproduced conventional results. The advantages of using BoP were compared with using the entire sign. BoPs has a better generalization towards signer-independence. Embodiments described herein have shown excellent properties when tested on an ASL database, which resulted in a database almost five times larger than the Arabic database. The ratio of the number of postures required to generate signs to the number of signs is reduced (33 postures for 23 signs reduced to 86 postures for 112 signs). This helps in simplifying the problem of sign recognition and allows for a large vocabulary to be recognized. Second, the extension does not limit the recognition accuracy.

Embodiments described herein also show a number of technical advantages. The database system 200 illustrated in FIG. 1B demonstrates the efficiency in which training frames 110 for a plurality of sign languages can be cross-referenced to an associated sign language database table in the BoFs database 135, which is also cross-referenced to an associated sign language database table in the BoPs database 145. This results in the applicable sign language table in the sign table database 180.

In response to selecting a first sign language from the training frames 110, a first enhanced data packet is transferred by the database server 210 from the BoFs database 135 to the associated sign language table in the BoPs database 145. Likewise, a second enhanced data packet is transferred by the database server 210 from the BoPs database 145 to the associated sign table in the sign table database 180. By condensing the data associated with the request into a single data structure that is transmitted as an enhanced data packet, vast amounts of data are condensed, which reduces computer network congestion.

The database system 200 illustrated in FIG. 1C also demonstrates the efficiency and comprehensiveness in which training frames 110 in a first sign language can result in a sign language table in a second sign language from the conversion database 185.

Automated recognition of Arabic sign language (or any other language) eases the communication between deaf and non-deaf people. Recognition performance of Arabic sign language lags far behind American and other sign languages. Researchers in the field of sign language recognition face several challenges, such as high similarities of different signs, difficulty in determining the start and end of signs, lack of comprehensive and bench marking databases, etc. Embodiments described herein employ BoFs for the recognition of signs. In addition, a two-stage process uses BoFs for the recognition of primitive poses (postures) in the first stage and uses BoPs for the recognition of signs.

The database of Shanableh et al. was used, which included twenty three signs performed by three signers with no assumption on the background and no gloves worn. Dense SIFT, SIFT, and Harris Laplace detector with SIFT descriptors were tested on the twenty three signs. A high accuracy that surpasses the state of the art for both signer-dependent and independent recognition was obtained. BoF-based posture recognition technique was applied to a database of 112 ASL signs from National Center for Sign Language and Gesture Resources site (NCSLGR). The results confirm the scalability of BoF-based postures recognition to a large number of signs.

Embodiments described herein include the following aspects.

(1) A method of recognizing sign language includes detecting, via circuitry, one or more interest points in an extracted sign language feature, wherein the one or more interest points are localized in space and time in each of a plurality of images acquired from a plurality of frames of a sign language video including the extracted sign language feature; applying a filter to determine one or more extrema of a central region of the one or more interest points; associating one or more features with each interest point of the one or more interest points using a neighboring pixel function; clustering, via the circuitry, a group of extracted sign language features from the plurality of images based on a similarity between the extracted sign language features according to the associating; representing each image of the plurality of images by a histogram of visual words corresponding to the respective image to generate a code book; training, via the circuitry, a classifier based on labels assigned to the plurality of images to classify each extracted sign language feature using the code book; detecting, via the circuitry, a posture in each frame of the plurality of frames of the sign language video using the trained classifier; and constructing, via the circuitry, a sign gesture based on the detected postures.

(2) The method of (1), wherein the filter includes a Difference of Gaussian (DoG) filter to detect a blob-like shape in each image as the one or more interest points.

(3) The method of either (1) or (2), further includes detecting the one or more interest points by a Scale Invariant Features Transform (SIFT) descriptor.

(4) The method of any one of (1) through (3), wherein the filter includes a Harris Laplace detector to detect corners in each image as the one or more interest points.

(5) The method of any one of (1) through (4), further includes training a Support Vector Machine to classify each frame of the sign language video.

(6) The method of any one of (1) through (5), further includes classifying each sign gesture using a K-Nearest Neighbors (K-NN) classifier.

(7) The method of any one of (1) through (6), further includes splitting a sequence of postures and generating a split histogram of the postures for the respective split sequence of postures, and concatenating the split sequence of postures to preserve an order of the sequence of postures in the respective sign gesture.

(8) The method of any one of (1) through (7), further includes normalizing the split histogram of the sequence of postures of the sign language video to account for a difference in signing speed.

(9) The method of any one of (1) through (8), further includes removing non-skin pixels from each frame of the sign language video prior to extracting the respective sign language feature.

(10) A sign language recognizer, includes circuitry. The circuitry is configured to detect one or more interest points in an extracted sign language feature, wherein the one or more interest points are localized in space and time in each of a plurality of images acquired from a plurality of frames of a sign language video including the extracted sign language feature; apply a filter to determine one or more extrema of a central region of the one or more interest points; associate one or more features with each interest point of the one or more interest points using a neighboring pixel function; cluster a group of extracted sign language features from the plurality of images based on a similarity between the extracted sign language features according to the associating; represent each image of the plurality of images by a histogram of visual words corresponding to the respective image to generate a code book; train a classifier based on labels assigned to the plurality of images to classify each extracted sign language feature using the code book; detect a posture in each frame of the plurality of frames of the sign language video using the trained classifier; and construct a sign gesture based on the detected postures.

(11) The sign language recognizer of (10), wherein the filter includes a Difference of Gaussian (DoG) filter to detect a blob-like shape in each image as the one or more interest points.

(12) The sign language recognizer of either (10) or (11), wherein the circuitry is further configured to detect the one or more interest points by a Scale Invariant Features Transform (SIFT) descriptor.

(13) The sign language recognizer of any one of (10) through (12), wherein the filter includes a Harris Laplace detector to detect corners in each image as the one or more interest points.

(14) The sign language recognizer of any one of (10) through (13), wherein the circuitry is further configured to train a Support Vector Machine to classify each frame of the sign language video.

(15) The sign language recognizer of any one of (10) through (14), wherein the circuitry is further configured to classify each sign gesture using a K-Nearest Neighbors (K-NN) classifier.

(16) The sign language recognizer of any one of (10) through (15), wherein the circuitry is further configured to split a sequence of postures and generate a split histogram of the postures for the respective sequence of split posture; and concatenate the split sequence of postures to preserve an order of the sequence of postures in the respective sign gesture.

(17) The sign language recognizer of any one of (10) through (16), wherein the circuitry is further configured to normalize the split histogram of the sequence of postures of the sign language video to account for a difference in signing speed.

(18) The sign language recognizer of any one of (10) through (17), wherein the circuitry is further configured to remove non-skin pixels from each frame of the sign language video prior to extracting the respective sign language feature.

(19) A non-transitory computer-readable medium having computer-executable instructions embodied thereon, that when executed by a computing device causes the computing device to perform a method. The method includes detecting one or more interest points in an extracted sign language feature, wherein the one or more interest points are localized in space and time in each of a plurality of images acquired from a plurality of frames of a sign language video including the extracted sign language feature; applying a filter to determine one or more extrema of a central region of the one or more interest points; associating one or more features with each interest point of the one or more interest points using a neighboring pixel function; clustering a group of extracted sign language features from the plurality of images based on a similarity between the extracted sign language features according to the associating; representing each image of the plurality of images by a histogram of visual words corresponding to the respective image to generate a code book; training a classifier based on labels assigned to the plurality of images to classify each extracted sign language feature using the code book; detecting a posture in each frame of the plurality of frames of the sign language video using the trained classifier; and constructing a sign gesture based on the detected postures.

(20) The non-transitory computer-readable medium of (19), the method further includes detecting the one or more interest points by a Scale Invariant Features Transform (SIFT) descriptor.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A computer-implemented method of recognizing sign language, the method comprising:
    detecting, via circuitry, one or more interest points in an extracted sign language feature, wherein the one or more interest points are localized in space and time in each of a plurality of images acquired from a plurality of frames of a sign language video including the extracted sign language feature;
    applying a digital filter to determine one or more extrema of a central region of the one or more interest points;
    associating one or more features with each interest point of the one or more interest points using a neighboring pixel function;
    clustering, via the circuitry, a group of extracted sign language features from the plurality of images based on a similarity between the extracted sign language features according to the associating;
    representing each image of the plurality of images by a histogram of visual words corresponding to the respective image to generate a code book;
    training, via the circuitry, a classifier based on labels assigned to the plurality of images to classify each extracted sign language feature using the code book;
    detecting, via the circuitry, a posture in each frame of the plurality of frames of the sign language video using the trained classifier;
    constructing, via the circuitry, a sign gesture based on the detected postures, and
    identifying text words that correspond with the sign gesture and presenting the text on a display so as to ease communication between deaf people and non-deaf people.

2. The method of claim 1, wherein the filter includes a Difference of Gaussian (DoG) filter to detect a blob-like shape in each image as the one or more interest points.

3. The method of claim 1, further comprising:
    detecting the one or more interest points by a Scale Invariant Features Transform (SIFT) descriptor.

4. The method of claim 1, wherein the filter includes a Harris Laplace detector to detect corners in each image as the one or more interest points.

5. The method of claim 1, further comprising:
    training a Support Vector Machine to classify each frame of the sign language video.

6. The method of claim 1, further comprising:
classifying each sign gesture using a K-Nearest Neighbors (K-NN) classifier.

7. The method of claim 1, further comprising:
splitting a sequence of postures, and generating a split histogram of the postures for the respective split sequence of postures; and
concatenating the split sequence of postures to preserve an order of the sequence of postures in the respective sign gesture.

8. The method of claim 7, further comprising:
normalizing the split histogram of the sequence of postures of the sign language video to account for a difference in signing speed.

9. The method of claim 1, further comprising:
removing non-skin pixels from each frame of the sign language video prior to extracting the respective sign language feature.

10. A computer implemented sign language recognizer, comprising:
a display;
circuitry configured to
detect one or more interest points in an extracted sign language feature, wherein the one or more interest points are localized in space and time in each of a plurality of images acquired from a plurality of frames of a sign language video including the extracted sign language feature,
apply a digital filter to determine one or more extrema of a central region of the one or more interest points,
associate one or more features with each interest point of the one or more interest points using a neighboring pixel function,
cluster a group of extracted sign language features from the plurality of images based on a similarity between the extracted sign language features according to the associating,
represent each image of the plurality of images by a histogram of visual words corresponding to the respective image to venerate a code book,
train a classifier based on labels assigned to the plurality of images to classify each extracted sign language feature using the code book,
detect a posture in each frame of the plurality of frames of the sign language video using the trained classifier, and
construct a sign gesture based on the detected postures,
identify with a programmed processor text words that correspond with the sign gesture and present the text on a display so as to ease communication between deaf people and non-deaf people.

11. The sign language recognizer of claim 10, wherein the filter includes a Difference of Gaussian (DoG) filter to detect a blob-like shape in each image as the one or more interest points.

12. The sign language recognizer of claim 10, wherein the circuitry is further configured to detect the one or more interest points by a Scale Invariant Features Transform (SIFT) descriptor.

13. The sign language recognizer of claim 10, wherein the filter includes a Harris Laplace detector to detect corners in each image as the one or more interest points.

14. The sign language recognizer of claim 10, wherein the circuitry is further configured to train a Support Vector Machine to classify each frame of the sign language video.

15. The sign language recognizer of claim 10, wherein the circuitry is further configured to classify each sign gesture using a K-Nearest Neighbors (K-NN) classifier.

16. The sign language recognizer of claim 10, wherein the circuitry is further configured to
split a sequence of postures and generate a split histogram of the postures for the respective sequence of split posture; and
concatenate the split sequence of postures to preserve an order of the sequence of postures in the respective sign gesture.

17. The sign language recognizer of claim 16, wherein the circuitry is further configured to normalize the split histogram of the sequence of postures of the sign language video to account for a difference in signing speed.

18. The sign language recognizer of claim 10, wherein the circuitry is further configured to remove non-skin pixels from each frame of the sign language video prior to extracting the respective sign language feature.

19. A non-transitory computer-readable medium having computer-executable instructions embodied thereon, that when executed by a computing device causes the computing device to perform a method comprising:
detecting one or more interest points in an extracted sign language feature, wherein the one or more interest points are localized in space and time in each of a plurality of images acquired from a plurality of frames of a sign language video including the extracted sign language feature;
applying a filter to determine one or more extrema of a central region of the one or more interest points;
associating one or more features with each interest point of the one or more interest points using a neighboring pixel function;
clustering a group of extracted sign language features from the plurality of images based on a similarity between the extracted sign language features according to the associating;
representing each image of the plurality of images by a histogram of visual words corresponding to the respective image to generate a code book;
training a classifier based on labels assigned to the plurality of images to classify each extracted sign language feature using the code book;
detecting a posture in each frame of the plurality of frames of the sign language video using the trained classifier; and
constructing a sign gesture based on the detected postures, and
identifying text words that correspond with the sign gesture and presenting the text on a display so as to ease communication between deaf people and non-deaf people.

20. The non-transitory computer-readable medium of claim 19, the method further comprising:
detecting the one or more interest points by a Scale Invariant Features Transform (SIFT) descriptor.

* * * * *